A. J. COLLAR.
FISH SCREEN AND SLUICE BOX.
APPLICATION FILED JULY 1, 1908. RENEWED MAR. 30, 1910.
971,492.
Patented Sept. 27, 1910.
2 SHEETS—SHEET 1.
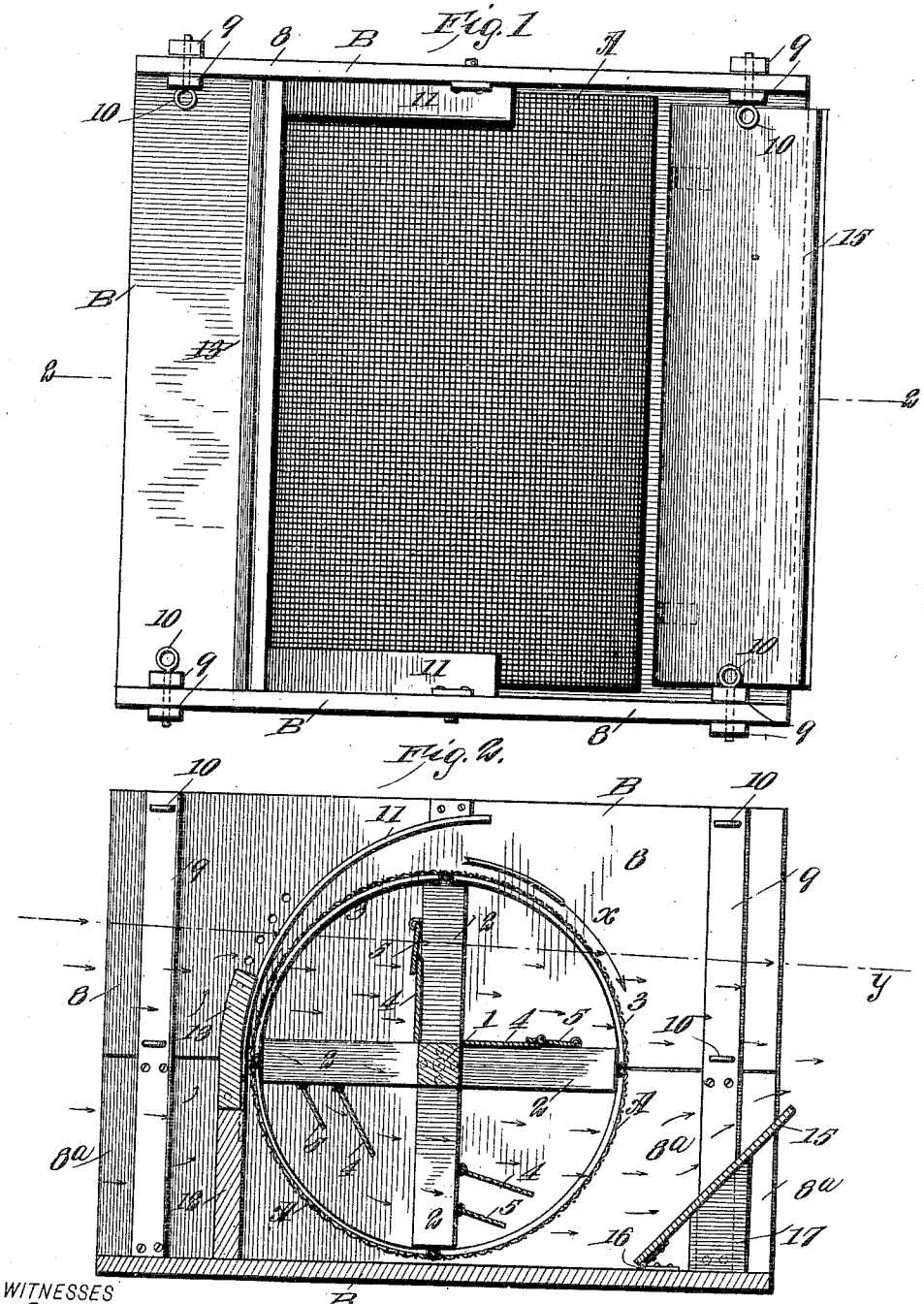
WITNESSES
INVENTOR
ADONIRAM J. COLLAR
BY
ATTORNEYS A. J. COLLAR.
FISH SCREEN AND SLUICE BOX.
APPLICATION FILED JULY 1, 1908. RENEWED MAR. 30, 1910.
971,492.
Patented Sept. 27, 1910.
2 SHEETS—SHEET 2.
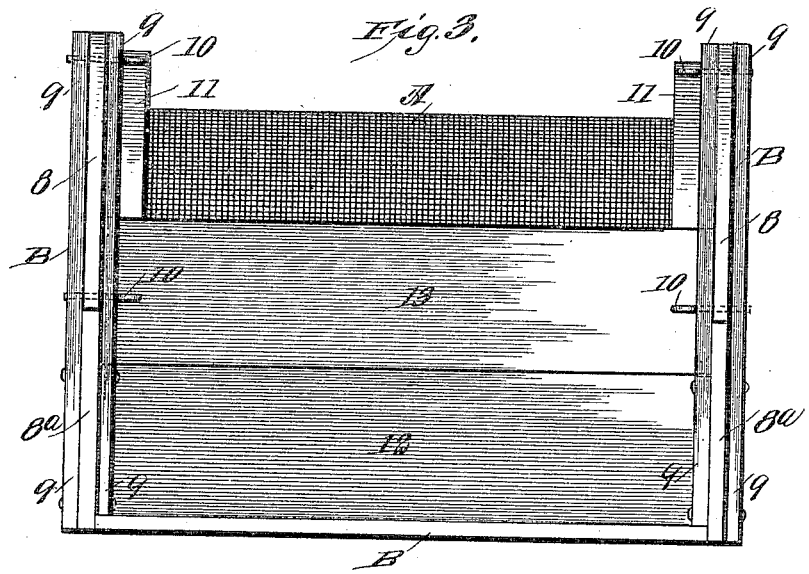
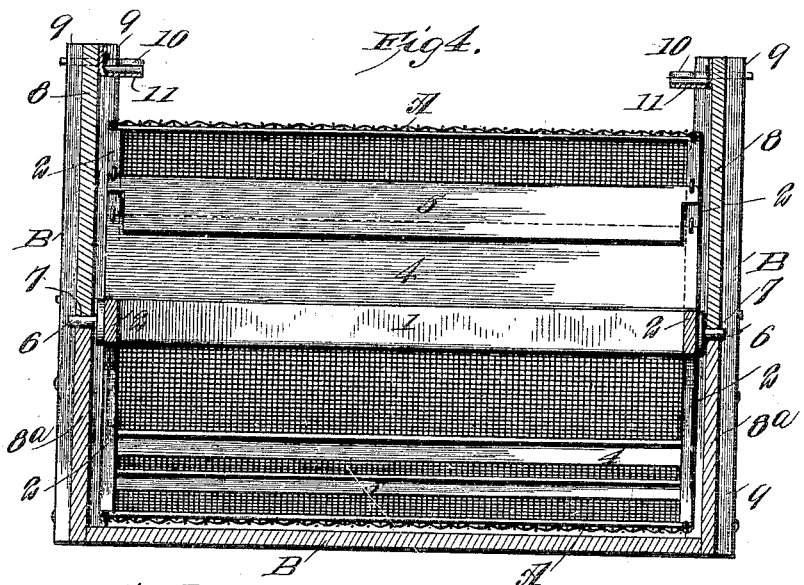
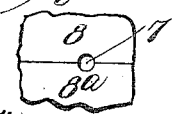
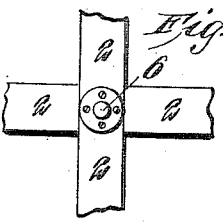
WITNESSES
INVENTOR
Adoniram J. Collar
BY
ATTORNEYS.

UNITED STATES PATENT OFFICE.

ADONIRAM JUDSON COLLAR, OF YREKA, CALIFORNIA.

FISH-SCREEN AND SLUICE-BOX.

971,492. Specification of Letters Patent. Patented Sept. 27, 1910.

Application filed July 1, 1908, Serial No. 441,297. Renewed March 30, 1910. Serial No. 552,416.

*To all whom it may concern:*

Be it known that I, ADONIRAM JUDSON COLLAR, a citizen of the United States, and a resident of Yreka, in the county of Siskiyou and State of California, have made certain new and useful Improvements in Fish-Screens and Sluice-Boxes, of which the following is a specification.

The object of my invention is to provide an improved rotatable screen for use in irrigating ditches or flumes, for the purpose of preventing fish running along the same so as to pass out on to the land where the water is utilized, and thus dying there.

The construction and operation of the screen together with the sluicebox in which the screen proper is supported, are as hereinafter described.

Referring to the drawings, which form a part hereof—Figure 1 is a plan view of the screen together with the sluice-box; Fig. 2 is a vertical section on the line 2—2 of Fig. 1; Fig. 3 is an end view of the screen and sluice-box; Fig. 4 is a vertical transverse section of the same; and Figs. 5 and 6 are detail views that will be hereinafter referred to.

The screen A is arranged in a sluice-box B, which is in practice anchored in an irrigating ditch or flume and at such depth that the screen, which is journaled in the sides of the sluice-box, projects a short distance above the surface of the water. The sluice-box B has a horizontal bottom and parallel sides but is open at the ends. The screen is cylindrical in form and constructed of woven wire of the requisite mesh, or any other suitable reticulated material that will allow water to flow through the screen but prevent the passage of fish above a certain size.

The frame of the screen, as shown in Figs. 2 and 4, may be formed of a central horizontal beam or bar 1 and a series of radial arms 2, which are arranged at the ends, and also at intervals between the ends of the screen. The screen proper 3 is attached to the ends of these arms 2 or rather to bars or hoops secured to the arms. To one side of the arms of each bar are attached blades or paddles 4 and 5, the same being hinged so that they are adapted to feather, or change position with the current, as indicated in Fig. 2. The blade or paddle 4 is arranged nearer the center of the screen frame, and the narrow one 5 is arranged exteriorly thereof, but adapted to fold on the outer edge of the blade 4.

In Fig. 2, the long curved arrow *x* indicates the direction of rotation of the screen and the line *y* indicates the surface of the water, while the smaller arrows indicate the direction of flow of the water. It will be seen that the top portion of the screen A projects above the surface of the water. It will be further seen that the blades or paddles on the lower side of the frame are feathered, that is to say, they are carried with the current and thus pass easily through the water, while those on the other side of the screen frame fold against the arms 2 and thus resist the passage of the water, which, of course, has the effect of rotating the screen. In brief, by the force of the current the screen is automatically revolved at a speed proportioned to the rapidity of the current, the blades feathering automatically as already indicated. The blades break the current more or less and aid in washing off of the screen the fine moss and grass that tend to adhere to it.

The cruciform ends of the screen frame are provided with journals 6 (see Fig. 6), which enter holes 7 (see Fig. 5) formed in the sides of the sluice-box. The upper half or section 8 of each half of the sluice-box is removable, whereby provision is made for removal of the screen so that it may be stored when not required for use. To provide for detachment of the upper sections 8, vertical cleats or bars 9 may be secured to the lower sections 8ª, the upper sections 8 being adapted to slide into place between the cleats and are secured by pins 10, as shown in several figures. By withdrawing the pins 10, the sections 8 may be easily lifted out of place, whereby the gudgeons or journals 6 of the screen will be left free.

I provide guards 11 for the ends of the screen, the same preventing the entrance of fish or floating trash between the ends of the screen proper and the sides of the sluice-box. The guards may be formed of narrow strips of galvanized metal, or any other material may be utilized. They are secured to the upper sections 8 of the sluice-box and project down below the same as indicated in Fig. 2. It will be further seen that the guards project near the periphery of the screen in their lower portions, and are separated from it more and more in their upper portions, which is for the purpose of causing trash or floating material to pass up over the screen in a way that would not be practicable if the guards were arranged concentric with the screen. The lower portion of the sluice-box B has a transverse partition or guard 12 (see Figs. 2 and 3), which serves to prevent floating rubbish or trash from striking the lower portion of the screen. Water may flow through the lower portion provided it has also free flow through the upper one. The removable guard 13 is arranged above and supported upon the fixed guard 12 and the upper section 8 of the sluice-box may have a series of holes at 14 to receive pins by which the removable guard may be secured adjustably. On the lower or down-stream side of the screen, the sluice-box B is provided with another guard 15 which is hinged at 16 to the bottom of the sluice-box and which may be supported at any required angle or elevation by means of any suitable device, say a stone, or block, 17.

I claim:

1. The combination, with a sluice-box adapted to be secured in a ditch or flume, of a rotatable reticulated screen comprising a cylindrical screen proper and the frame arranged within the same and having a series of transverse bars and flat blades or paddles which are hinged to the transverse bars forming part of the frame, whereby they are adapted to swing and pass through the current on the lower side of the screen and assume an opposing position on the upper side of the screen as shown and described.

2. The combination, with a sluice-box and a rotatable cylindrical screen arranged therein, of arc-shaped guards secured to the inner sides of the sluice-box on the upstream side, their upper portion being arranged at a gradually increased distance from the periphery of the screen, as shown and described.

3. The combination, with a sluice-box comprising a bottom and parallel fixed side sections, removable side sections supported above and upon such fixed sections, and a rotatable screen whose journals project between the two sections, as shown and described.

4. The combination, of a rotatable screen with a sluice-box having a guard 12 arranged transversely on the up-stream side, and a removable guard arranged above and upon such fixed guard, as shown and described.

5. The combination, of the rotatable screen with a sluice-box having a guard on the down-stream side which is hinged to the bottom of the sluice-box, and means for supporting such guards at different inclinations, as shown and described.

ADONIRAM JUDSON COLLAR.

Witnesses:
JAS. R. TAPSCOTT,
E. ELMER SMITH.